(12) United States Patent
Ridout

(10) Patent No.: US 12,715,570 B2
(45) Date of Patent: Aug. 25, 2026

(54) BYPASS DEVICE FOR AN AIRCRAFT CABLE RACEWAY

(71) Applicant: LATELEC, Toulouse (FR)

(72) Inventor: Olivier Ridout, Aberdeenshire (GB)

(73) Assignee: LATELEC, Toulouse (FR)

( * ) Notice: Subject to any disclaimer, the term of this patent is extended or adjusted under 35 U.S.C. 154(b) by 176 days.

(21) Appl. No.: 18/292,617

(22) PCT Filed: Jul. 19, 2022

(86) PCT No.: PCT/EP2022/070275
§ 371 (c)(1),
(2) Date: Jan. 26, 2024

(87) PCT Pub. No.: WO2023/006527
PCT Pub. Date: Feb. 2, 2023

(65) Prior Publication Data

US 2024/0425170 A1 Dec. 26, 2024

(30) Foreign Application Priority Data

Jul. 28, 2021 (FR) ...................................... 2108219

(51) Int. Cl.
*B64C 1/40* (2006.01)
*H02G 3/32* (2006.01)

(52) U.S. Cl.
CPC ............... *B64C 1/406* (2013.01); *H02G 3/32* (2013.01)

(58) Field of Classification Search
CPC ....... F16L 3/14; F16L 3/00; F16L 3/02; F16L 3/04; F16L 3/08; F16L 3/12; F16B 2/02; F16B 2/04; F16B 2/06; F16B 2/10; B64C 1/406; H02G 3/32; H02G 3/0437
USPC ............ 248/229.13, 229.14, 229.23, 229.24, 248/316.5, 70, 74.1, 74.2, 230.5, 230.4, 248/231.61, 231.51
See application file for complete search history.

(56) References Cited

U.S. PATENT DOCUMENTS 5,133,523 A * 7/1992 Daigle .................. F16L 3/1075 248/62
6,243,928 B1 * 6/2001 Powell .................... F16L 3/127 24/297

(Continued)

FOREIGN PATENT DOCUMENTS

| CN | 107 208 826 | 9/2017 |
|---|---|---|
| DE | 20 2017 107545 | 3/2019 |
| JP | 2002 218623 | 8/2002 |

*Primary Examiner* — Alfred J Wujciak
(74) *Attorney, Agent, or Firm* — Defillo & Associates, Inc.; Evelyn A. Defillo

(57) ABSTRACT

A bypass device (3) having an electrical harness (4) for an aircraft cable raceway, the device being suitable for steering the trajectory of an electrical harness away from a cable guide channel of an aircraft cable raceway, the bypass device includes: a clip-on support base (5); a pad (13) opposite the support base (5), the pad (13) having a support groove; a central body (15) attached on one side to the support base (5) and on the other side to the pad (13), the central body (15) being suitable for being positioned opposite a cable guide channel when the bypass device (3) is attached to an aircraft cable raceway, the central body (15) having a bypass clamp (17) for the electrical harness; the support base (5) and the pad (13) being suitable for being attached to two side walls (1,2) adjacent to a guide channel of a cable raceway.

9 Claims, 4 Drawing Sheets

(56) References Cited

U.S. PATENT DOCUMENTS

| | | | | |
|---|---|---|---|---|
| 6,708,933 | B2 * | 3/2004 | Girodo | B60R 16/0215 24/561 |
| 2018/0274572 | A1 * | 9/2018 | Wang | F16B 2/12 |
| 2019/0339037 | A1 * | 11/2019 | Burton | F41A 23/06 |

* cited by examiner 9
6
3
8
5
14
15
20
13
23
21
25
24
22
19
18
17

7
9
3
14
10
10
13
6
20
5
16
26

15
19
17
18

3
9
8
6
14
5
13
20
15
26
22
19
17
18

9
8
9
10
3
10
6
13
14
20
5
7
27
15

22
18
17

BYPASS DEVICE FOR AN AIRCRAFT CABLE RACEWAY

CROSS REFERENCE TO RELATED APPLICATION

This application is a national stage entry of PCT/EP2022/070275 filed Jul. 19, 2022, under the International Convention and claiming priority over French Patent Application No. FR2108219 filed Jul. 28, 2021.

TECHNICAL FIELD

The invention relates to the field of aeronautics and focuses on the arrangement of cable raceways within aircraft electrical architectures.

Aircraft cable raceways define the paths of electrical cable assemblies relative to an aircraft structure, holding them in position and protecting them. Electrical cable assemblies consist of bundles of cables running between various electrical installations on the aircraft.

PRIOR ART

Aircraft cable raceways are generally made up of profile sections extending in the extension of one another. Between some profile sections, a predetermined gap is provided to allow relative movement of the profile sections without damage. This is because aircraft cable raceways may be secured to structural parts of the aircraft which may be flexible. For example, the cable raceways extending along the wings of an aircraft are subjected to a bending movement of relatively large amplitude during the flight of the aircraft.

Within each profile section, the known cable raceways include means for holding in place the electrical cable assemblies running in the cable raceway. For certain particular applications, the known cable raceways also include bypass devices allowing a cable assembly to be rerouted and taken out of the cable raceway, for example in order to connect it to nearby equipment.

Known bypass devices are generally bulky, heavy means secured to the entire structure of the profile sections constituting the cable raceway.

Utility model DE 20 2017 107545U1 and patent JP 2002 218623 describe electrical cable assembly bypass devices for aircraft cable raceways adapted to reroute the path of said cable assembly protruding from a cable guide channel of an aircraft cable raceway toward the outside of the cable raceway. This channel is delimited by a first side wall and a second side wall which are provided with a protruding lateral ledge in which is formed a through hole into which is clipped a support base provided with an attachment foot allowing it to be attached to the cable raceway by means of two elastic tabs each having a tooth. This bypass device further comprises,

- a block opposite the base and having a support groove the width of which corresponds to the thickness of the second side wall so as to grip said second wall, and
- a central body connected on one side to the base and on the other side to the block, this central body being adapted to be positioned opposite a cable guide channel when the bypass device is secured to an aircraft cable raceway, this central body comprising a rerouting jaw gripping said electrical cable assembly;
- the support base and the block being adapted to be secured to two adjacent side walls of a guide channel of a cable raceway.

However, the rerouting jaws described in these documents are not suitable for solving the technical problem addressed by the invention as they are not elastically deformable.

Patent CN 107 208 826 for its part describes an articulated jaw but this also does not include any flexible and/or elastically deformable element.

Recent development programs in the aeronautics sector have centered on the production of latest generation wings integrating new technologies and having the benefit of an accelerated production cycle, the aim being to save time and increase flexibility during aircraft assembly. These objectives go hand in hand with traditional concerns in the sector, namely the never-ending search for ways to save on weight. From this point of view, the known bypass devices are not in line with the desired objectives.

SUMMARY OF THE INVENTION

The aim of the invention is to improve the electrical cable assembly bypass devices for aircraft cable raceways of the prior art, with a view to achieving the production streamlining objectives inherent in the latest generation wing designs.

To this end, the invention relates to a bypass device for an electrical cable assembly for an aircraft cable raceway, this device being adapted to reroute the path of an electrical cable assembly from a cable guide channel of an aircraft cable raceway, toward the outside of the cable raceway. This bypass device comprises:

- a clip-on support base;
- a block opposite the support base, this block comprising a support groove;
- a central body connected on one side to the support base and on the other side to the block, this central body being adapted to be positioned opposite a cable guide channel when the bypass device is secured to an aircraft cable raceway, this central body comprising a rerouting jaw for an electrical cable assembly;
- the support base and the block being adapted to be secured to two adjacent side walls of a guide channel of a cable raceway.

According to further subject matter, the invention relates to an aircraft cable raceway comprising at least two guide channels each bordered by a first side wall and a second side wall, and which comprises:

- a lateral ledge protruding from an outer face of the first side wall of a first guide channel, this lateral ledge comprising an attachment hole passing right through it;
- a bypass device as described above, the support base of which is clipped into the attachment hole in the lateral ledge and the block of which is mounted on the second side wall of the first guide channel, such that the support groove bears on the edge of this second side wall, the central body of the bypass device being positioned opposite the first guide channel, an electrical cable assembly protruding from the first guide channel being gripped in the rerouting jaw.

The electrical cable assembly bypass devices for aircraft cable raceways according to the invention afford a significant saving in terms of material, and therefore weight, as well as cost, compared to the devices of the prior art.

The cable guide channels are individual and an electrical cable assembly bypass device may be fitted in or removed from each cable guide channel, without affecting the other cable guide channels.

The design of the device according to the invention is considerably simplified compared to the prior art in which these same devices generally comprise bent and shaped aluminum sheets to which adapters are secured, the latter being expensive and heavy, and requiring considerable time for assembly using special tools.

The bypass device according to the invention may be removed without disconnecting the electrical cable assembly which it reroutes. Specifically, all that is required is to open the rerouting jaw of the central body and unclip the bypass device from the aircraft cable raceway to remove it and thus release the electrical cable assembly which was rerouted. The bypass device may also be fitted (or refitted) while keeping in place the electrical cable assembly to be rerouted, without the need to disconnect the latter. The bypass device may therefore be fitted after the cabling has been installed and in particular after the electrical cable assembly to be rerouted has been mounted and connected to the electrical equipment. Compared to the prior art, this possibility does away with a significant constraint which restricted the aircraft assembly process.

The bypass device is put in place by clipping onto the cable raceway and the electrical cable assembly, which is already connected, is then inserted into the rerouting jaw before the latter is closed.

Furthermore, according to a preferred feature, these operations are carried out without tools, quickly, and with a low degree of complexity.

The bypass device according to the invention may include the following additional features, alone or in combination:

- the support base comprises an attachment foot which includes elastic clipping elements;
- the attachment foot comprises at least two elastic tabs each comprising a tooth;
- the attachment foot comprises positioning pins flanking the elastic tabs;
- the attachment foot comprises stop surfaces opposite the teeth of the elastic tabs;
- the rerouting jaw comprises a lower jaw articulated to an upper jaw, one of which is provided with a flexible covering while the other is provided with an elastically deformable element;
- said elastically deformable element is a flexible concave blade;
- said elastically deformable element is a set of elastically deformable ribs extending coaxially;
- the block is connected to the central body by an insulating protective wall;
- the central body includes a protective cup protruding from the rerouting jaw.

The aircraft cable raceway according to the invention may include the following additional feature:

- the support groove has a width corresponding to the thickness of the second side wall.

BRIEF DESCRIPTION OF THE FIGURES

Further features and advantages of the invention will emerge from the non-limiting description set out below, with reference to the appended drawings in which.

Elements which are similar and common to the various embodiments bear the same reference numbers in the figures.

DETAILED DESCRIPTION OF THE INVENTION

Figure 1:
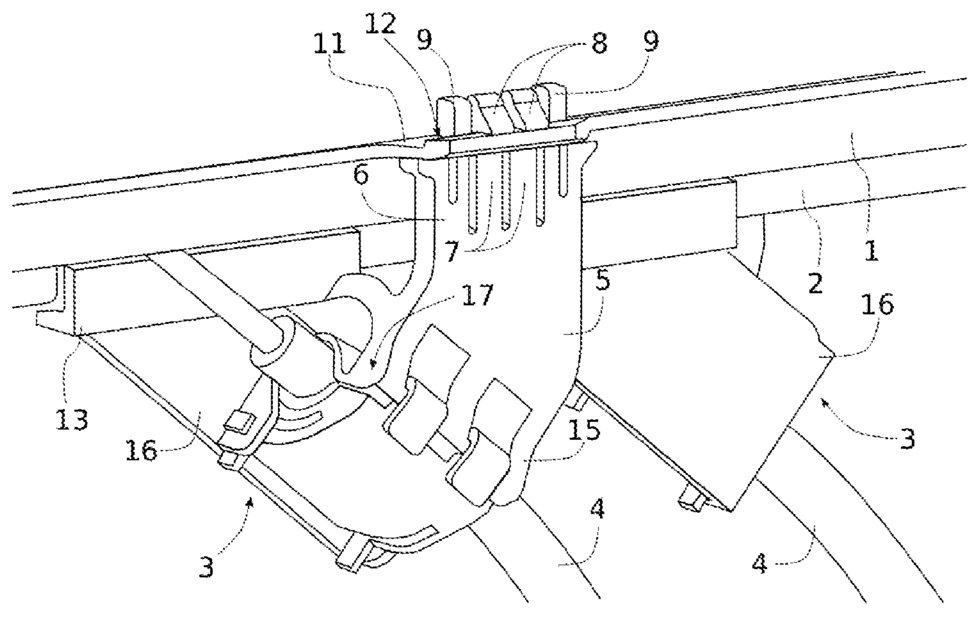
FIG. 1 is a perspective view of an aircraft cable raceway equipped with bypass devices according to the invention.

FIG. 1 depicts an aircraft cable raceway equipped with electrical cable assembly bypass devices, according to the invention.

The aircraft cable raceway is a classic cable raceway formed for example by a metal profile section, defining several cable guide channels as respective pathways in which electrical cable assemblies to be guided and protected may be arranged.

The cable raceway shown (only a portion of this cable raceway is visible in the upper part of FIG. 1) thus comprises a first side wall 1 (which forms the outer side wall of the cable raceway) and a second side wall 2. These two walls 1, 2 delimit a first guide channel. In the present example, the cable raceway also includes a second guide channel, adjacent to the first (the second side wall 2 separates the two guide channels).

A bypass device 3 is mounted on each of the guide channels, in such a way as to reroute the path of an electrical cable assembly from each guide channel, toward the outside of the cable raceway.

Each bypass device 3 holds the rerouted electrical cable assembly 4, positioning it such that it forms a protruding curve relative to the guide channel from which it comes. The electrical cable assemblies 4 may thus be taken from the cable raceway by the bypass device 3, so as to be connected for example to equipment or to join another cable raceway.

In the example illustrated, the rerouted electrical cable assemblies 4 are bundles of cables shown in FIG. 1 by an electrical conductor and its sheath. The bypass device 3 may reroute any other type of electrical cable assembly from the cable raceway.

Figure 2:
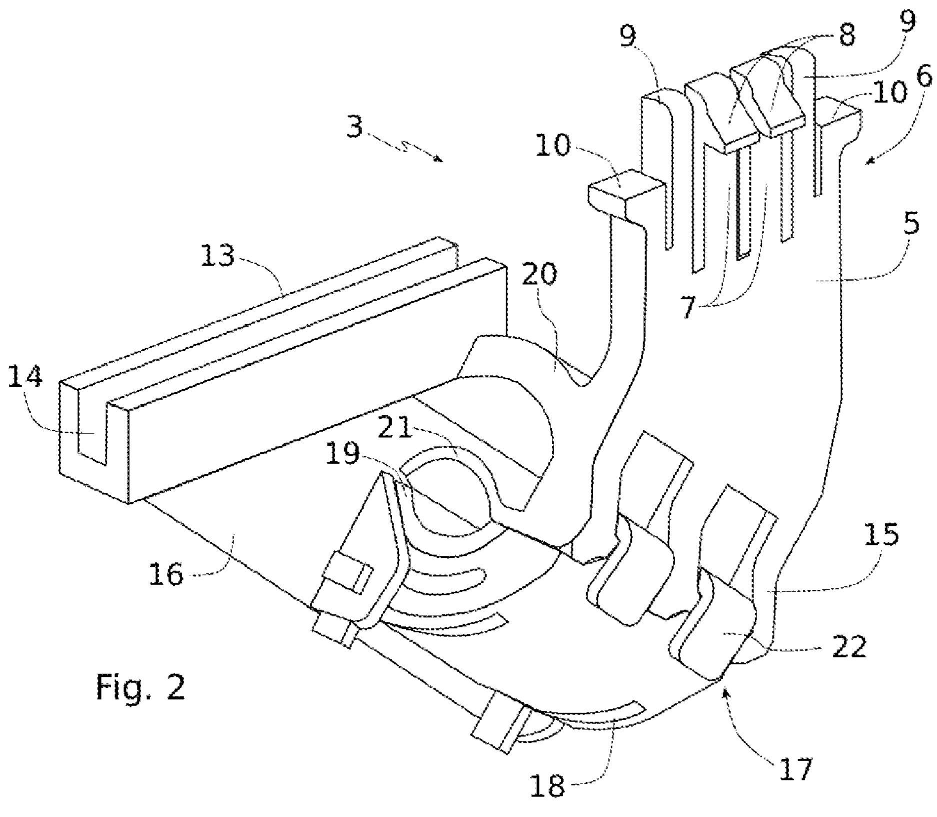
FIG. 2 shows a bypass device according to the invention.

FIG. 2 shows in perspective one of the bypass devices 3 of FIG. 1.

This bypass device 3 comprises a support base 5 which is provided with an attachment foot 6 allowing it to be attached to the cable raceway. The attachment foot 6 comprises two elastic tabs 7 each having a tooth 8. The elastic tabs 7 are flanked by two positioning pins 9.

The attachment foot 6 also includes two stop surfaces 10 opposite the teeth 8.

The attachment foot 6 allows the support base 5 to be clipped onto the cable raceway. For this purpose, the cable raceway comprises on each of its outer walls (with reference to FIG. 1, the first side wall 1 is one of these outer walls), a lateral ledge 11 protruding from the outer face of this outer wall.

The first side wall 1 thus comprises a lateral ledge 11 protruding from the outer face of this side wall 1. This lateral ledge 11 has, passing right through it, an attachment hole 12 which is, in the present example, of rectangular section.

The elastic properties of the tabs 7 allow the attachment foot 6 to be clipped into the attachment hole 12. During this clipping operation, the positioning pins 9 are inserted into the attachment hole 12 by being fitted snugly in this attachment hole 12, which allows reliable positioning of the attachment foot 6.

After the clipping operation, the teeth 8 and the stop surfaces 10 grip the thickness of the lateral ledge 11 between them. The support base 5 is thus positioned and secured so as to be in interlocking connection with the lateral ledge 11. This operation is simple, quick, and requires no tools.

Doubling up on the elastic tab 7 also allows redundancy in terms of safety, such that breakage of an elastic tab 7 does not result in failure.

The bypass device 3 further comprises a block 13 opposite the support base 5. This block 13 has a support groove 14.

The support groove 14, which is made in the block 13, has a width corresponding to the thickness of the second side wall 2 of the cable raceway.

The bypass device 3 is thus mounted on a guide channel by clipping the support base 5, via the attachment foot 6, onto the lateral ledge 11 of the first side wall 1, and by pushing the block 13 onto the second side wall 2, the support groove 14 gripping this second side wall 2.

The bypass device 3 further comprises a central body 15 which is connected on one side to the support base 5 and on the other side to the block 13.

The central body 15 is connected to the block 13 via a protective wall 16 that protects against electric arcs. The protective wall 16 is made of an insulating material and has sufficient thickness to prevent the occurrence of electric arcs given the voltages used in the application. This is because an electric arc may form between the electrical cable assembly 4 which is rerouted and other electrical cable assemblies located in the adjacent guide channel. This risk is encountered in particular in recent aircraft where the power cabling and the signal cabling may be installed in the same cable raceways.

In the present example, the central body 15, the protective wall 16, the block 13 and the support base 5 are made in one piece by molding an insulating material.

When the bypass device 3 is secured to the aircraft cable raceway, the central body 15 is positioned opposite the corresponding guide channel to make it possible to take hold of the electrical cable assembly 4 to be rerouted. This electrical cable assembly 4 is held in the central body 15 by a rerouting jaw 17.

Figure 3:
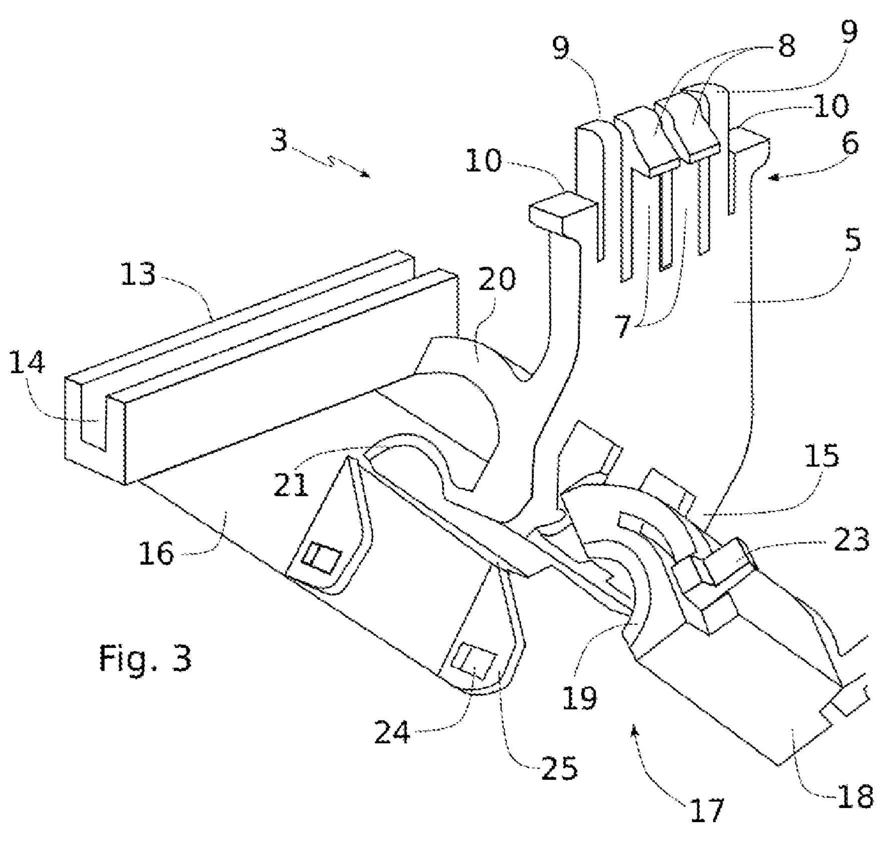
FIG. 3 shows the bypass device of FIG. 2 with its rerouting jaw open.

In FIGS. 1 and 2, the jaw 17 is shown in the closed position while FIG. 3 is a perspective view showing the jaw 17 in the open position.

Figure 4:
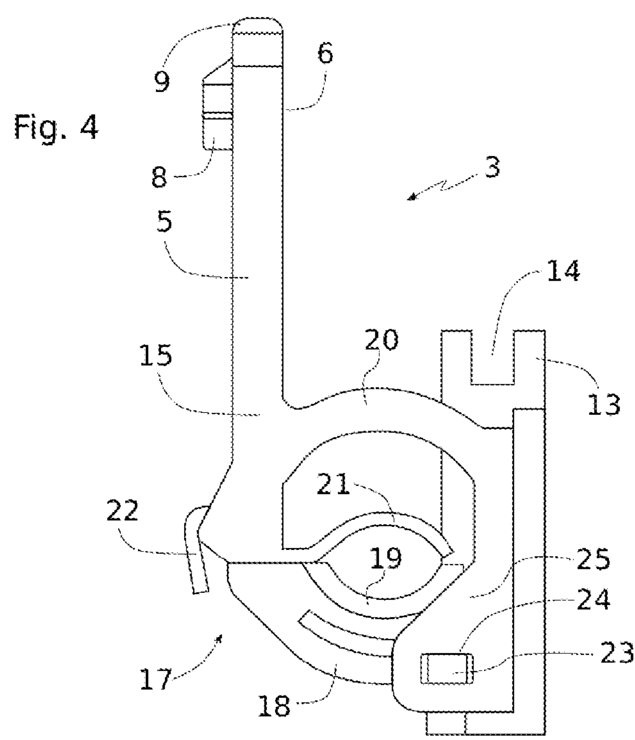
FIG. 4 shows the bypass device of FIG. 2 in cross section.
Figure 5:
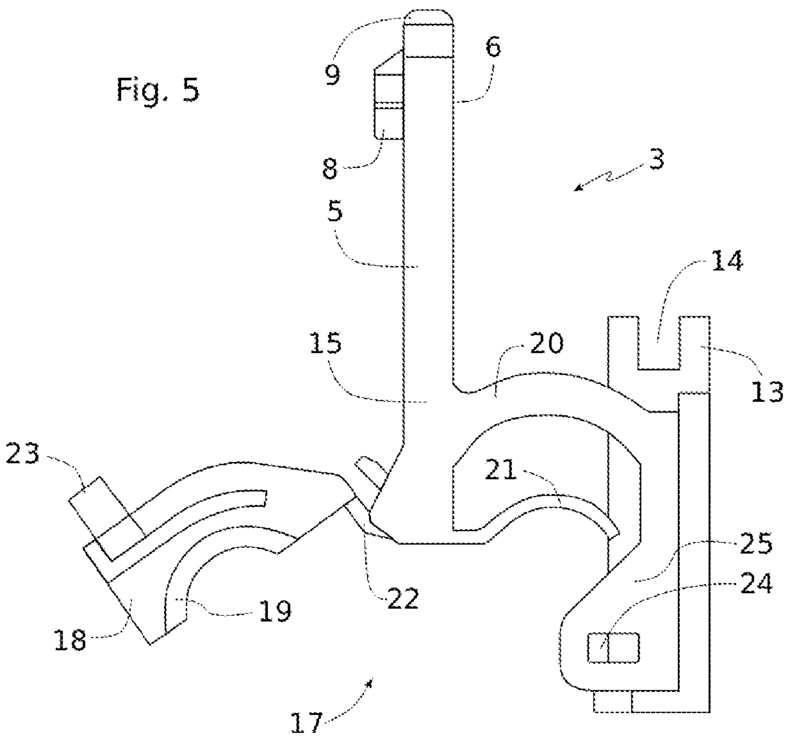
FIG. 5 shows the bypass device in cross section with its rerouting jaw open.

FIG. 4 depicts the bypass device 3 in cross section and shows in particular the profile of the jaw 17. FIG. 5 is a view similar to FIG. 4 with the jaw 17 in the open position.

The jaw 17 comprises two opposing elements intended to clamp the electrical cable assembly 4:

a lower jaw 18 provided with a flexible covering 19;

an upper jaw 20 provided with a flexible blade 21.

The flexible blade 21 has a concave shape adapted to an electrical cable assembly 4 of substantially cylindrical outer shape. When the jaw 17 is clamped on the electrical cable assembly 4, the flexible covering 19 pushes the electrical cable assembly 4, without damaging it, against the flexible blade 21 which deforms to exert a contained, even calibrated, return force on the electrical cable assembly 4.

The electrical cable assembly 4 is thus firmly held in place, without the risk of damage (bearing in mind the level of safety required for cabling in the aeronautical field).

In the present example, the lower jaw 18 and the upper jaw 20 are articulated by hinges 22 formed by complementary shapes of the jaws 18, 20.

The jaw 17 further comprises closure means consisting of elastic tabs 23 located on the lower jaw 18, and complementary holes 24 made in a yoke 25 which is secured to the protective wall 16. These means make it possible to keep the jaw 17 closed, following a simple clipping operation, and allow it to be opened by an unclipping operation, always without tools.

Figure 6:
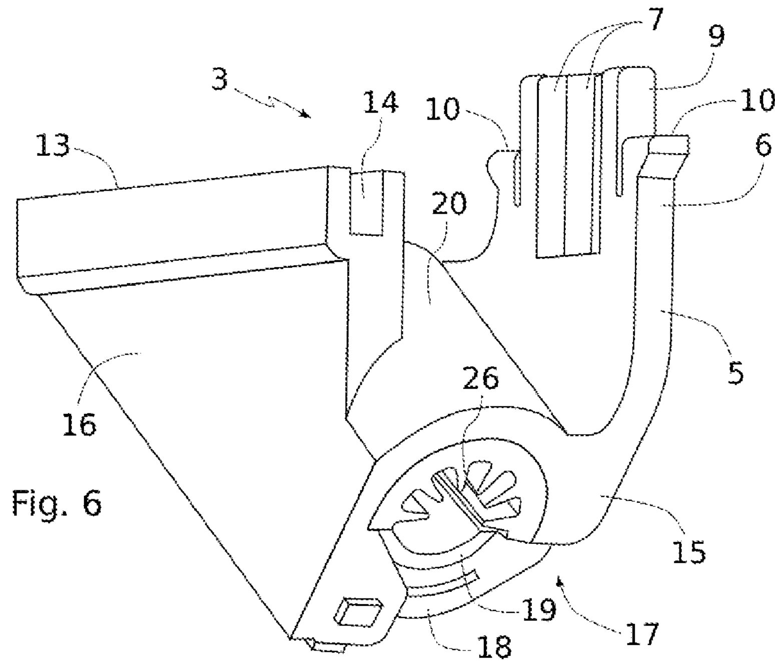
FIG. 6 shows a bypass device according to a second embodiment of the invention.
Figure 7:
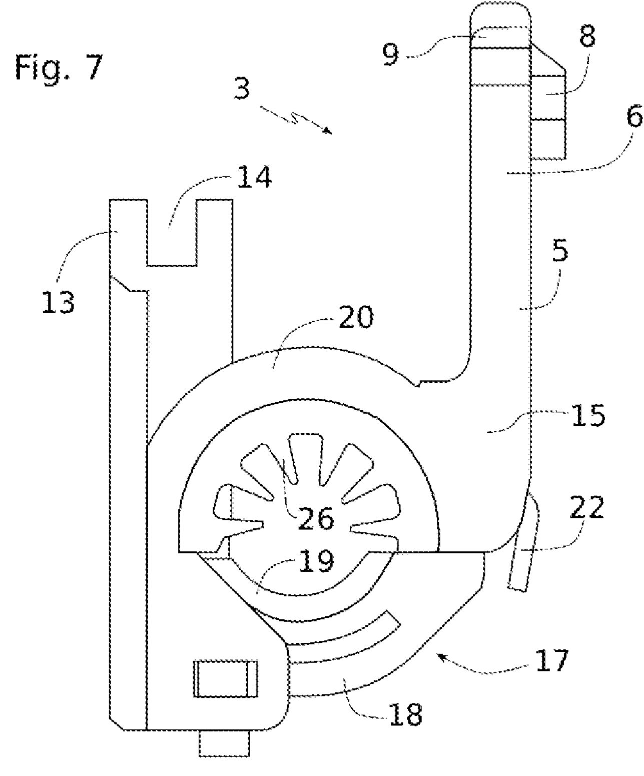
FIG. 7 shows the bypass device of FIG. 6, in cross section.

FIGS. 6 and 7 illustrate a second embodiment of the bypass device 3.

According to this second embodiment, the flexible blade of the upper jaw 17 is replaced by elastically deformable ribs 26 extending concentrically (that is to say they each extend along a radius of the same cylinder). These ribs 26 play a role in holding the electrical cable assembly 4, and as a means for exerting a calibrated force by an elastic element.

The flexible covering 19 and the elastically deformable ribs 26 are preferably overmolded directly on the central body 15.

Figure 8:
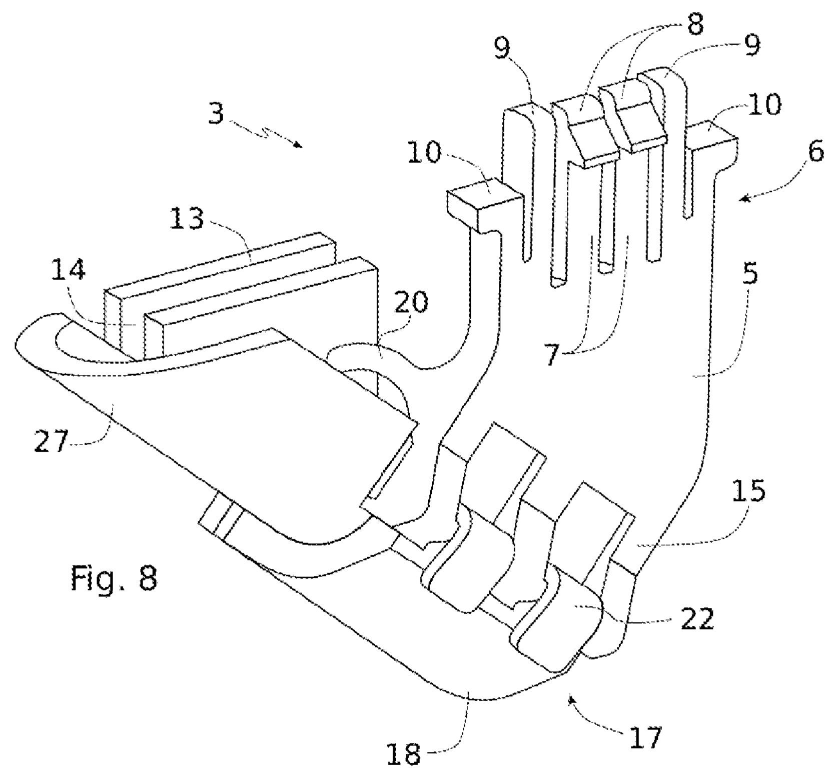
FIG. 8 shows a bypass device according to a third embodiment of the invention.

FIG. 8 illustrates a third embodiment of the bypass device 3 in which the action of the protective wall 16 is replaced, or supplemented, by a protective cup 27 extending coaxially with the housing of the jaw 17 which receives the electrical cable assembly 4, that is to say coaxially with the electrical cable assembly 4 itself when it is in place.

The protective cup 27, made of insulating material, provides protection against electric arcs and also provides mechanical protection for the electrical cable assembly 4. This protection concerns the entire portion of the electrical cable assembly rerouted, extending between the point where it leaves the cable raceway and the central body 15.

As many bypass devices 3 as electrical cable assemblies 4 to be rerouted may thus be positioned on a cable raceway. In addition to the advantages relating to the aircraft assembly process, these multiple and independent mechanisms allow localized intervention for maintenance and allow, for example, a particular point of failure to be detected without intervention on the entire arrangement of the cable raceway.

Variant embodiments of the bypass device 3 may be implemented. For example, the angle of rerouting of the bypass device 3 may vary to adapt to a particular use. This angle may go as far as a jaw 17 extending parallel to the direction in which the electrical cable assemblies run in the cable raceway, rerouting then being effected by the curvature of the electrical cable assembly from the point where it leaves the jaw 17.

The invention claimed is:

1. A bypass device (3) for an electrical cable assembly (4) for an aircraft cable raceway, the device being adapted to reroute the path of said cable assembly protruding from a cable guide channel of an aircraft cable raceway toward the outside of the cable raceway, a support base (5) provided with an attachment foot (6) allowing the support base to be attached to the cable raceway by two elastic tabs (7) each having a tooth (8), the bypass device (3) further comprising a block (13) opposite the base (5) and having a support groove (14) a width of which corresponds to the thickness of a second side wall (2) so as to grip said second wall, and a central body (15) connected on one side to the base (5) and on the other side to the block (13), the central body (15) being adapted to be positioned opposite a cable guide channel when the bypass device (3) is secured to an aircraft cable raceway, the central body (15) comprising a rerouting jaw (17) suitable to grip said electrical cable assembly (4);

the support base (5) and the block (13) being adapted to be secured to two adjacent side walls (1, 2) of a guide channel of a cable raceway, wherein the rerouting jaw (17) comprises a lower jaw (18) articulated to an upper jaw (20), one of which is provided with a flexible covering (19) while the other is provided with an elastically deformable element.

2. The bypass device as claimed in claim 1, wherein the attachment foot (6) comprises positioning pins (9) flanking the elastic tabs (7).

3. The bypass device as claimed in claim 1, wherein the attachment foot (6) comprises stop surfaces (10) opposite the teeth (8) of the elastic tabs (7).

4. The bypass device as claimed in claim 1, wherein said elastically deformable element is a flexible concave blade (21).

5. The bypass device as claimed in claim 1, wherein said elastically deformable element is a set of elastically deformable ribs (26) extending coaxially.

6. The bypass device as claimed in claim 1, wherein the block (13) is connected to the central body (15) by an insulating protective wall (16).

7. The bypass device as claimed in claim 1, wherein the central body (15) includes a protective cup (27) protruding from the rerouting jaw (17).

8. An aircraft cable raceway comprising:

at least two guide channels each bordered by a first side wall (1) and a second side wall (2):

a lateral ledge (11) protruding from an outer face of the first side wall (1) of a first guide channel, the lateral ledge (11) comprising an attachment hole (12) passing right through it;

the bypass device (3), as claimed in claim 1, the support base (5) of which is clipped into the attachment hole (12) in the lateral ledge (11) and the block (13) of which is mounted on the second side wall (2) of the first guide channel, such that the support groove (14) bears on the edge of the second side wall (2), the central body (15) of the bypass device (3) being positioned opposite the first guide channel, an electrical cable assembly (4) protruding from the first guide channel being gripped in the rerouting jaw (17).

9. The aircraft cable raceway as claimed in claim 8, wherein the support groove (14) has a width corresponding to the thickness of the second side wall (2).

* * * * *